(12) United States Patent (10) Patent No.: US 12,677,071 B1

Goblirsch et al. (45) Date of Patent: Jul. 7, 2026

(54) STREET LIGHT CONTROLLER VIDEO SURVEILLANCE SYSTEM WITH ELECTRONIC PAN, TILT AND ZOOM CAPABILITY

(71) Applicant: Special Services Group, LLC, Marina, CA (US)

(72) Inventors: Elizabeth A. Goblirsch, Moss Landing, CA (US); Andrew J. Ashworth, Camas, WA (US)

(73) Assignee: Special Services Group, LLC, Marina, CA (US)

( * ) Notice: Subject to any disclaimer, the term of this patent is extended or adjusted under 35 U.S.C. 154(b) by 28 days.

(21) Appl. No.: 19/037,593

(22) Filed: Jan. 27, 2025

Related U.S. Application Data

(63) Continuation-in-part of application No. 18/155,847, filed on Jan. 18, 2023, now Pat. No. 12,250,495.

(60) Provisional application No. 63/266,950, filed on Jan. 20, 2022.

(51) Int. Cl.
| | |
|---|---|
| *H04N 23/74* | (2023.01) |
| *H04N 7/18* | (2006.01) |
| *H04N 23/52* | (2023.01) |
| *H04N 23/69* | (2023.01) |
| *H04N 23/695* | (2023.01) |
| *H04N 23/71* | (2023.01) |

(52) U.S. Cl.
CPC ............. *H04N 23/74* (2023.01); *H04N 7/183* (2013.01); *H04N 23/52* (2023.01); *H04N 23/69* (2023.01); *H04N 23/695* (2023.01); *H04N 23/71* (2023.01)

(58) Field of Classification Search
CPC ...... H04N 23/74; H04N 23/69; H04N 23/695; H04N 23/71; H04N 23/52; H04N 7/183
USPC ......................................................... 348/143
See application file for complete search history.

(56) References Cited

U.S. PATENT DOCUMENTS

| | | | |
|---|---|---|---|
| 5,886,738 | A | 3/1999 | Hollenbeck et al. |
| 6,160,353 | A | 12/2000 | Mancuso |
| 6,948,826 | B2 | 9/2005 | Fogerlic |
| 7,500,794 | B1 | 3/2009 | Clark |
| 7,723,862 | B1 | 5/2010 | Spillman et al. |
| 8,249,444 | B2 | 8/2012 | Peterson et al. |
| 8,382,387 | B1 | 2/2013 | Sandoval |
| 8,711,216 | B2 | 4/2014 | Chien |
| 8,820,961 | B2 | 9/2014 | Kim |
| 9,131,557 | B2 | 9/2015 | Vadai et al. |
| 9,335,750 | B2 | 5/2016 | Lu et al. |
| 9,575,394 | B1 | 2/2017 | Wallace |
| 9,593,843 | B2 | 3/2017 | McRory |
| 10,536,673 | B2 | 1/2020 | Noone |
| 10,544,932 | B2 | 1/2020 | Gabriel et al. |
| 11,365,879 | B2 | 6/2022 | Leblanc et al. |
| 2008/0191897 | A1 | 8/2008 | McCollough |
| 2008/0224849 | A1 | 9/2008 | Sirhan |
| 2009/0027498 | A1 | 1/2009 | Owen et al. |
| 2009/0237509 | A1 | 9/2009 | Saxon |

(Continued)

*Primary Examiner* — Allen C Wong

(74) *Attorney, Agent, or Firm* — McHale & Slavin, P.A.

(57) ABSTRACT

Disclosed is a street light controller and concealed video surveillance system having a camera lens with electronic pan, tilt and zoom capability mounted in a lamp head for securement to a modern street light having a NEMA socket. The video surveillance device is a single, compact unit with a video compressor allowing live video to be wirelessly transmitted through cellular modem or microwave radio transmitters.

16 Claims, 11 Drawing Sheets

(56)         References Cited

U.S. PATENT DOCUMENTS

| | | | |
|---|---|---|---|
| 2011/0102587 A1 | 5/2011 | Zittel | |
| 2011/0141727 A1 | 6/2011 | Kim | |
| 2012/0081547 A1 | 4/2012 | Sitzmann et al. | |
| 2012/0113646 A1 | 5/2012 | Carmody | |
| 2012/0218421 A1 | 8/2012 | Chien | |
| 2012/0301102 A1* | 11/2012 | Jannard | G11B 27/031 |
| | | | 386/E5.069 |
| 2013/0130522 A1 | 5/2013 | Mitchell et al. | |
| 2014/0009632 A1 | 1/2014 | Glover | |
| 2014/0313343 A1 | 10/2014 | Frank et al. | |
| 2015/0124100 A1* | 5/2015 | McRory | H04N 23/50 |
| | | | 348/151 |
| 2015/0336521 A1 | 11/2015 | Tofilescu et al. | |
| 2015/0362172 A1* | 12/2015 | Gabriel | F21V 11/16 |
| | | | 348/151 |
| 2017/0332149 A1 | 11/2017 | Veeramani et al. | |
| 2020/0195938 A1 | 6/2020 | Beck et al. | |
| 2020/0383173 A1 | 12/2020 | Aaron et al. | |
| 2021/0071855 A1* | 3/2021 | Pan | F21V 23/045 |

* cited by examiner

STREET LIGHT CONTROLLER VIDEO SURVEILLANCE SYSTEM WITH ELECTRONIC PAN, TILT AND ZOOM CAPABILITY

PRIORITY CLAIM

In accordance with 37 C.F.R. 1.76, a claim of priority is included in an Application Data Sheet filed concurrently herewith. Accordingly, the present invention is a continuation-in-part of U.S. patent application Ser. No. 18/155,847 filed Jan. 18, 2023 entitled "STREET LIGHT CONTROLLER AND VIDEO SURVEILLANCE SYSTEM" which further claims priority based upon U.S. Provisional Patent Application No. 63/266,950 filed Jan. 20, 2022 entitled "STREET LIGHT CONTROLLER AND VIDEO SURVEILLANCE SYSTEM" the contents of which are incorporated herein by reference.

FIELD OF THE INVENTION

This invention is directed to the field of video surveillance systems; and in particular, to a compact video surveillance device concealed in a lamp head for use with modern street lights.

BACKGROUND OF THE INVENTION

Video surveillance systems are known in the industry. A common location to install a video surveillance system is on conventional light poles found along streets, highways and intersections. The light poles are used to position a light at a distance above road level, illuminating the surrounding area after darkness. Modern light poles further employ a light sensor, also commonly referred to as a photo controller or photo sensor, for operation of the light during darkness and low level light conditions. The sensor is based on the photoelectric effect principle of semiconductors, wherein a photoelectric device converts photons to electrons to complete an electrical circuit that powers the light. The sensor provides efficiency in operation so as to draw electricity only when needed, extending the life of the lighting element.

Conventional light pole assemblies utilize a NEMA power socket for receipt of the sensor assembly; the sensor being a replaceable device. Prior art recognizes the use of the NEMA power socket as a convenient way of powering a video surveillance system in combination with a photo sensor. The sensor operates a light based upon ambient lighting conditions, the video surveillance system drawing power from the NEMA socket.

Known video surveillance systems use one or more fixed length camera lens requiring multiple windows. Fixed focal length camera lenses limit the quality of the image based upon the distance an object or individual is removed from the camera. Still other known devices lack a recorder onboard, making them inefficient for law enforcement surveillance operations.

What is lacking in the art is a combined light sensor and video surveillance device that has a multi megapixel video sensor allowing live video transfer without complex devices tethered to the device, wherein the multi megapixel sensor contains several times the pixels required to generate the desired resolution thus allowing the sensor to be used for digital zoom and electronic pan and tilt.

SUMMARY OF THE INVENTION

Disclosed is a compact video surveillance system consisting of a multi megapixel video sensor with cellular modem or microwave radio transmitter and optional internal recorder. The system is designed covertly as a common electronic photo controller for use on modern street lights having a NEMA socket. The device has one window and an extremely small form factor that allows for surreptitious law enforcement deployments on street lights where photo controllers are normally located. The device offers full electronic pan, tilt and zoom capability for viewing, along with either a cellular modem or a microwave radio which alternately allows live video to be transferred across a network. An optional internal recorder is also included for edge video storage. The device power source is received from the street light socket and replaces the functionality of an original photo controller used for turning the street light on and off based on the ambient lighting conditions.

An objective of the invention is to provide a street light mounted surveillance device and system designed covertly as a common electronic photo controller for use on modern street lights. The device comprises a zoom camera with an optional encoder, the camera having an electronic pan, tilt and zoom abilities.

Another objective of the invention is to provide street light controller and surveillance system that having a cellular modem or microwave radio network connection wherein streaming video can be viewed live on video walls, PC's, and handheld mobile devices.

Yet still another objective of the invention is to provide a compact video surveillance device with adjustable, low bandwidth, high-quality video feed.

Still another objective of the invention is to employ the exhaust air from a heat sink to remove condensation from the lens assembly.

Other objectives and further advantages and benefits associated with this invention will be apparent to those skilled in the art from the description, examples and claims which follow.

DESCRIPTION OF THE PREFERRED EMBODIMENT

An embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
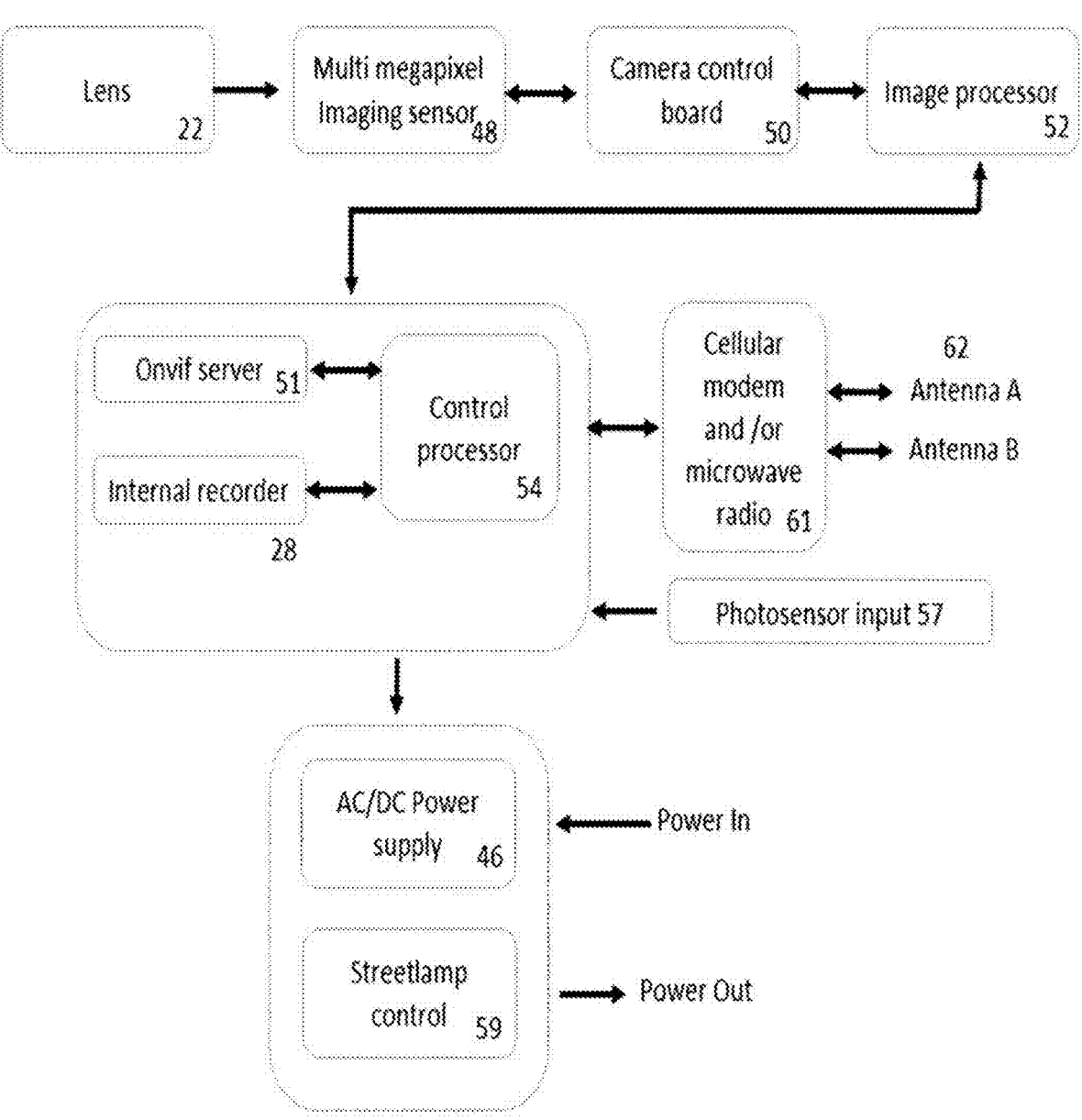
FIG. 1 is a block diagram listing the components of the street light controller and video surveillance system of the instant invention.
Figure 2:
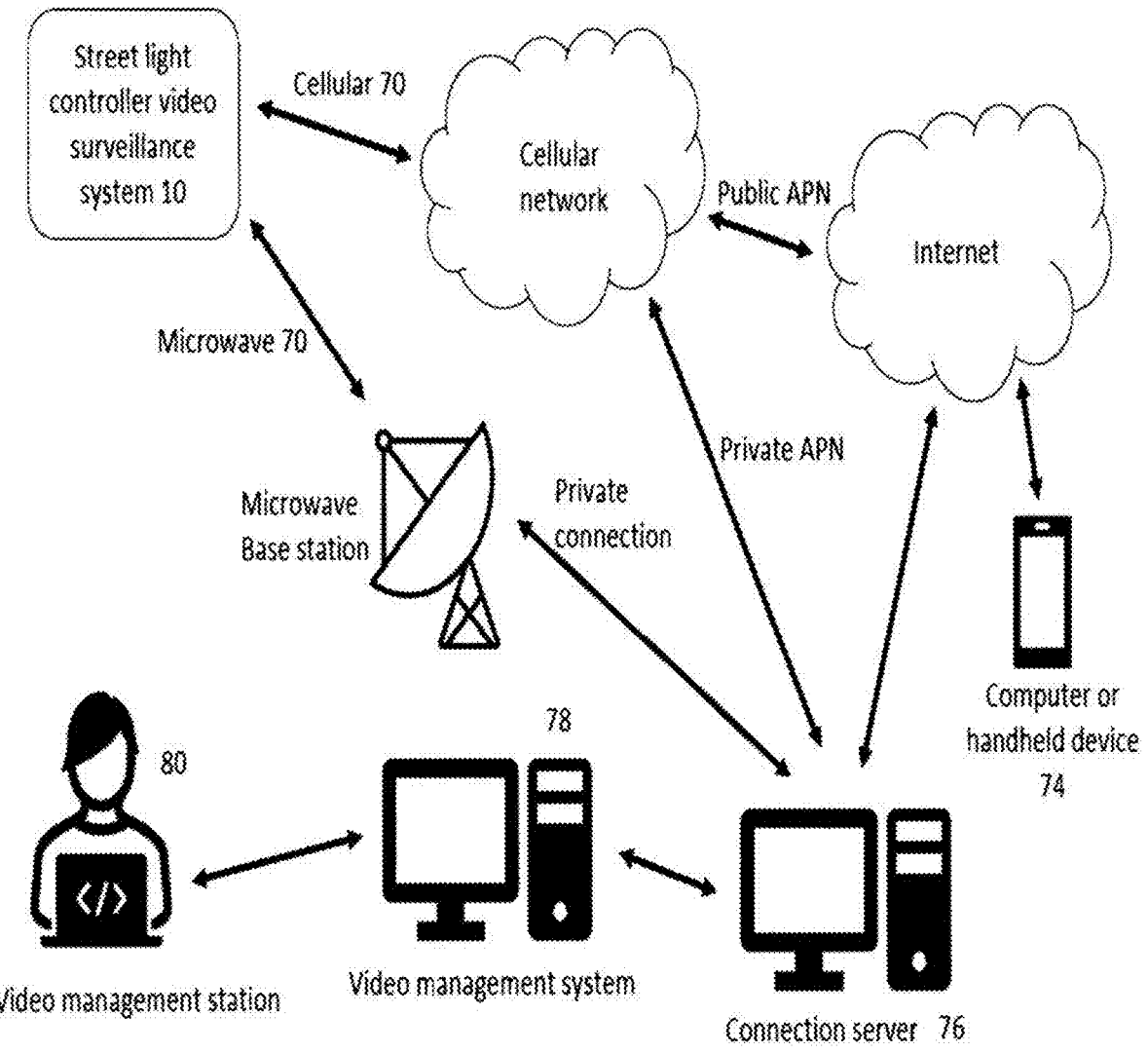
FIG. 2 is a flow diagram illustrating the interconnectivity of the instant invention through cellular or microwave connections to a management station or computer or handheld device.
Figure 3:
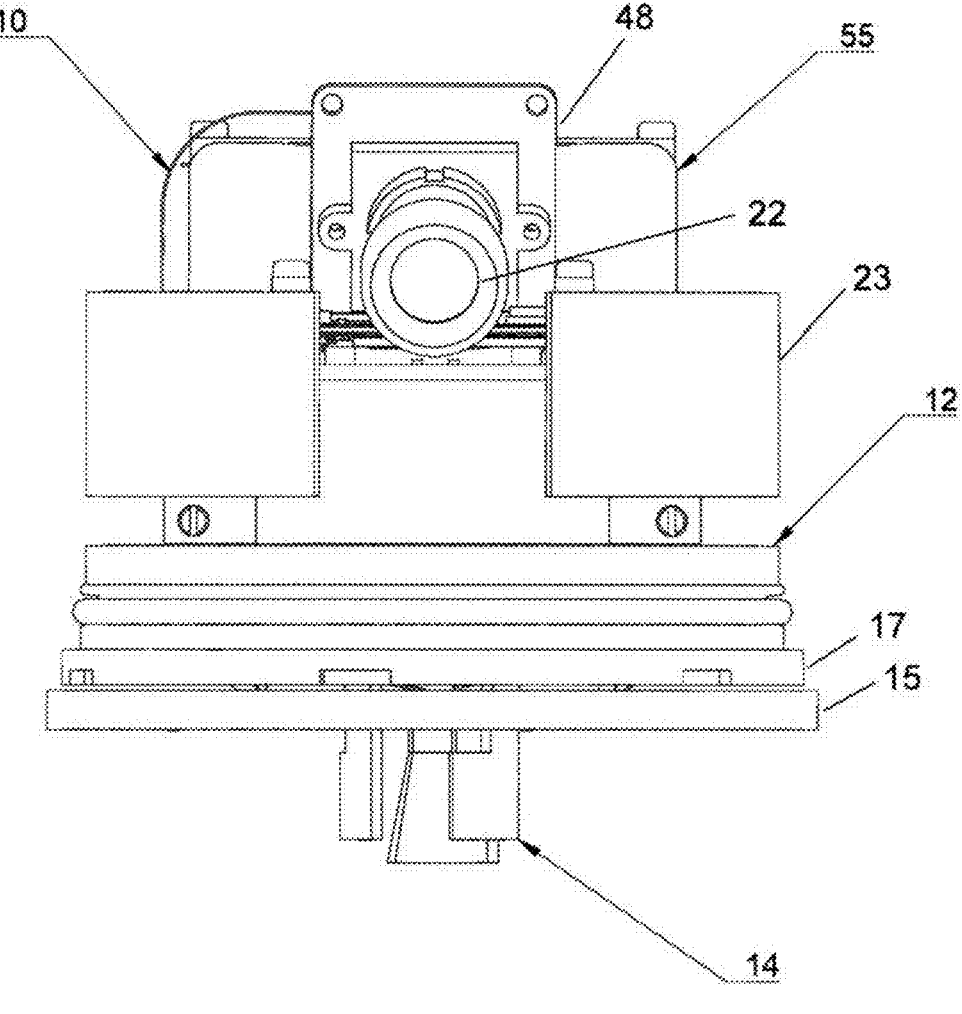
FIG. 3 is a front view of the street light controller and video surveillance device.
Figure 4:
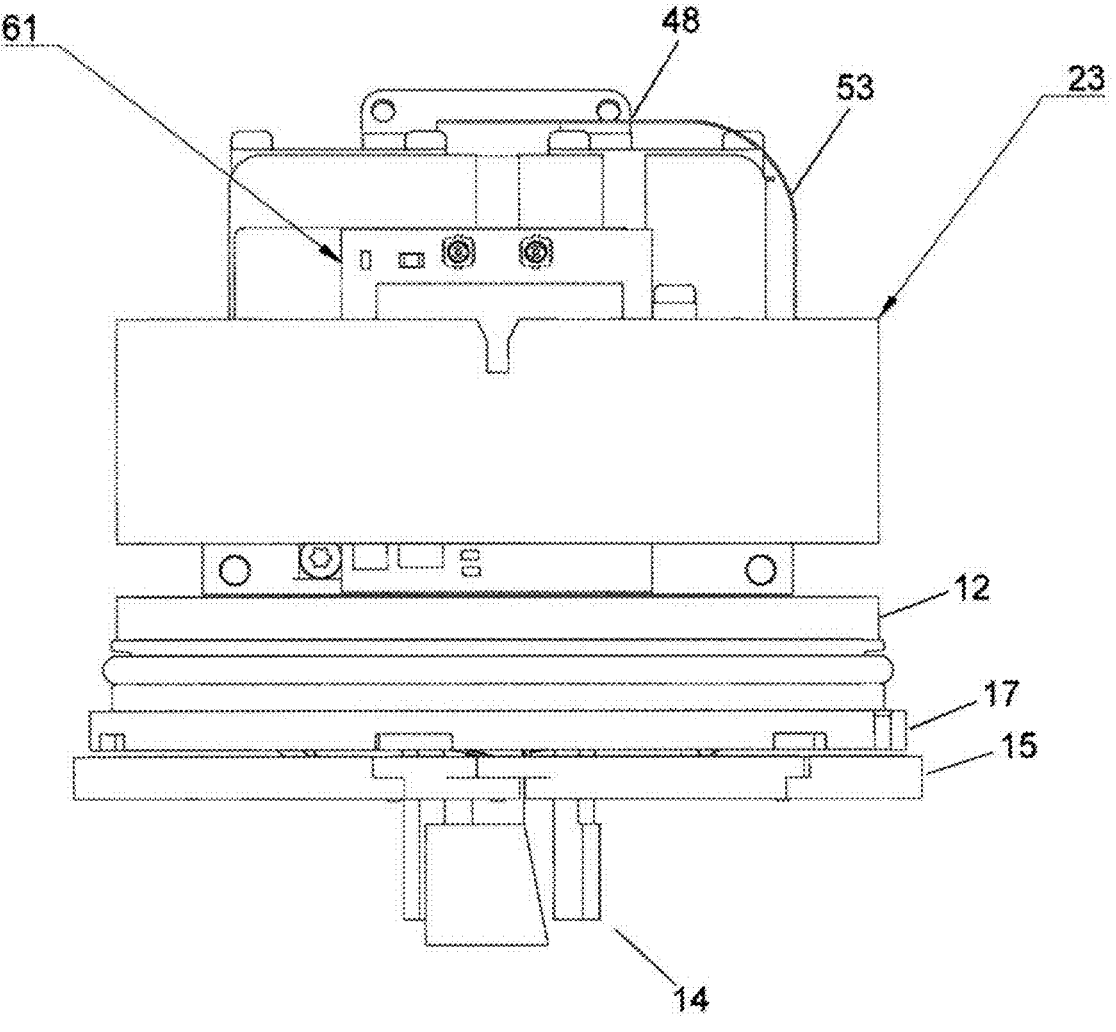
FIG. 4 is a rear view thereof.
Figure 5:
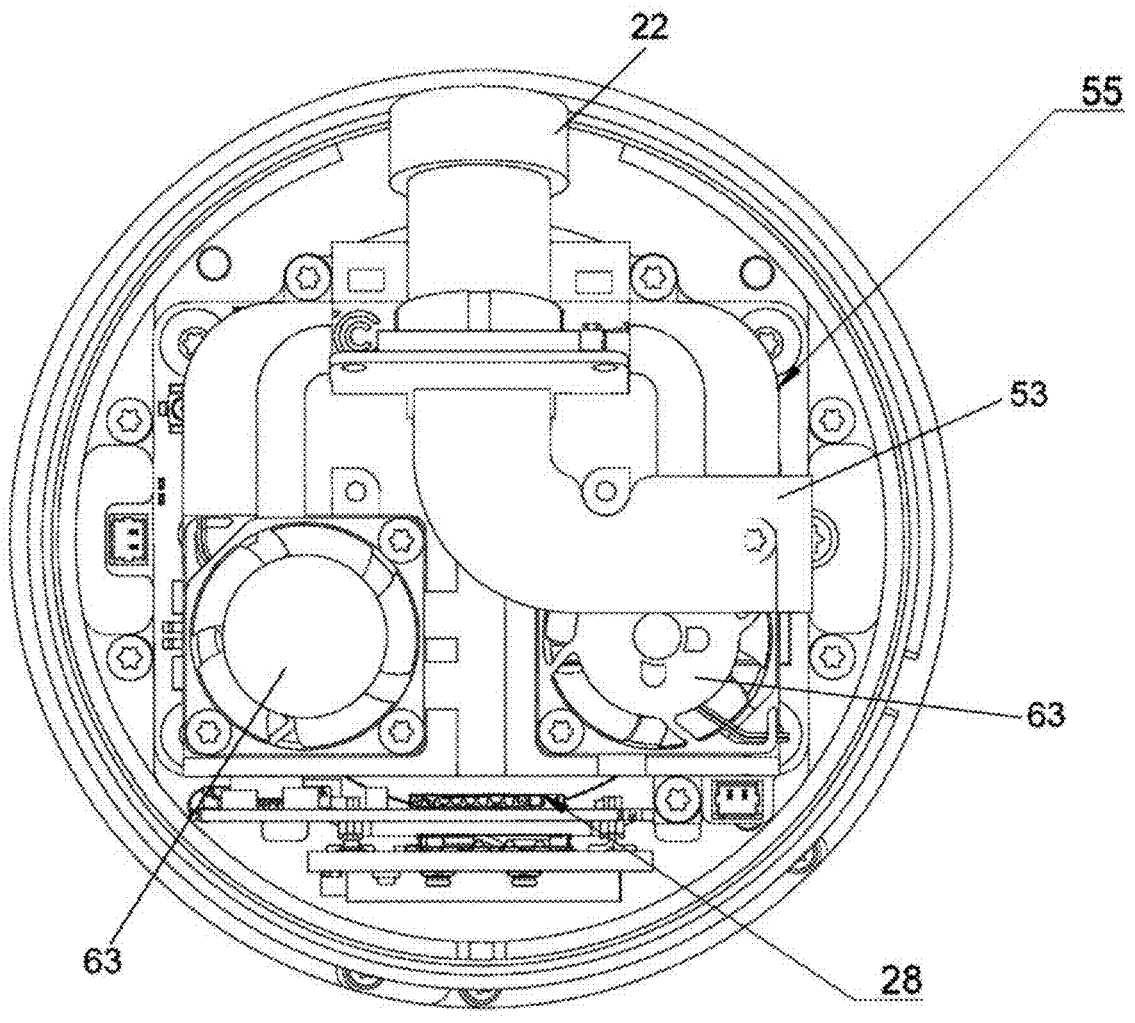
FIG. 5 is a top view thereof.
Figure 6:
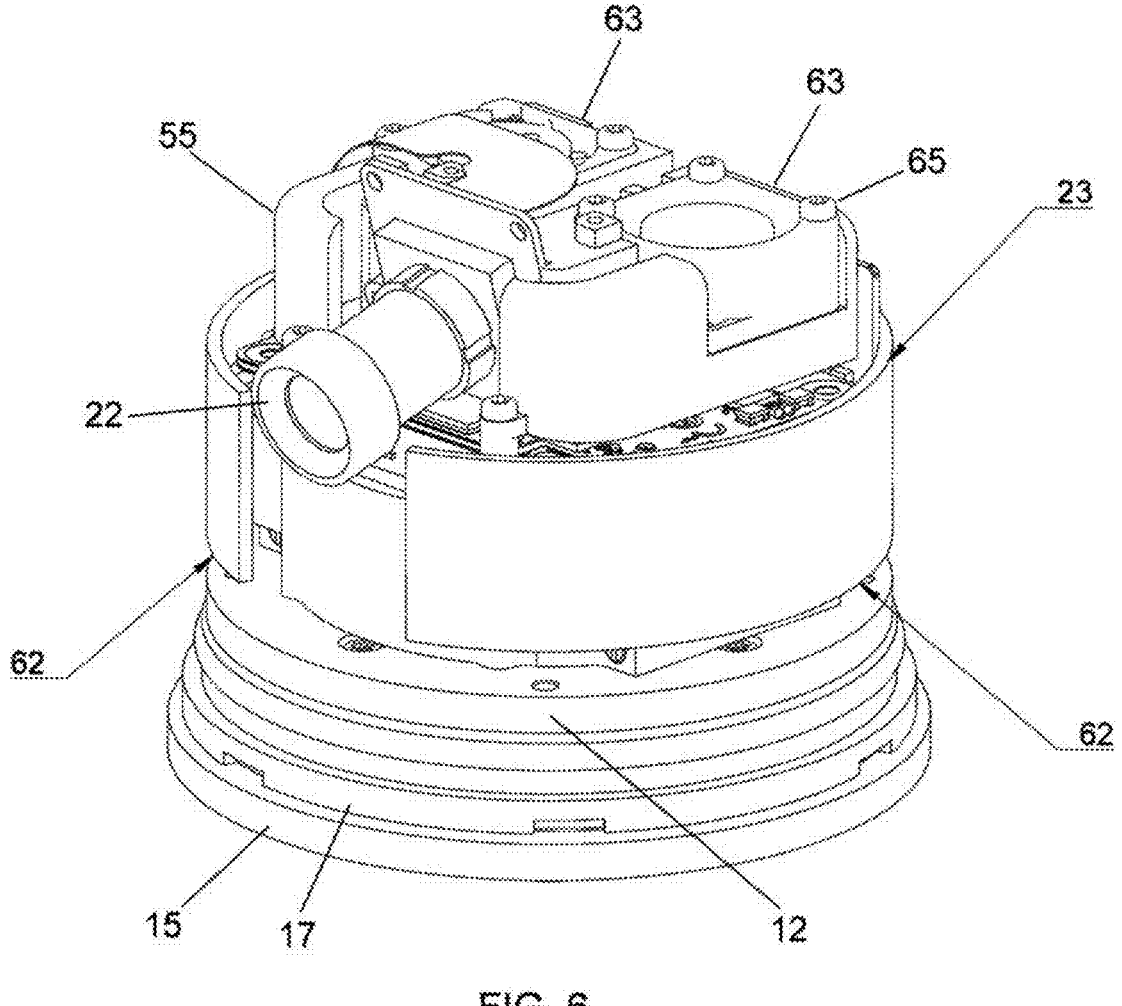
FIG. 6 is a perspective view of the street light controller and video surveillance device with the top enclosure removed.
Figure 7:
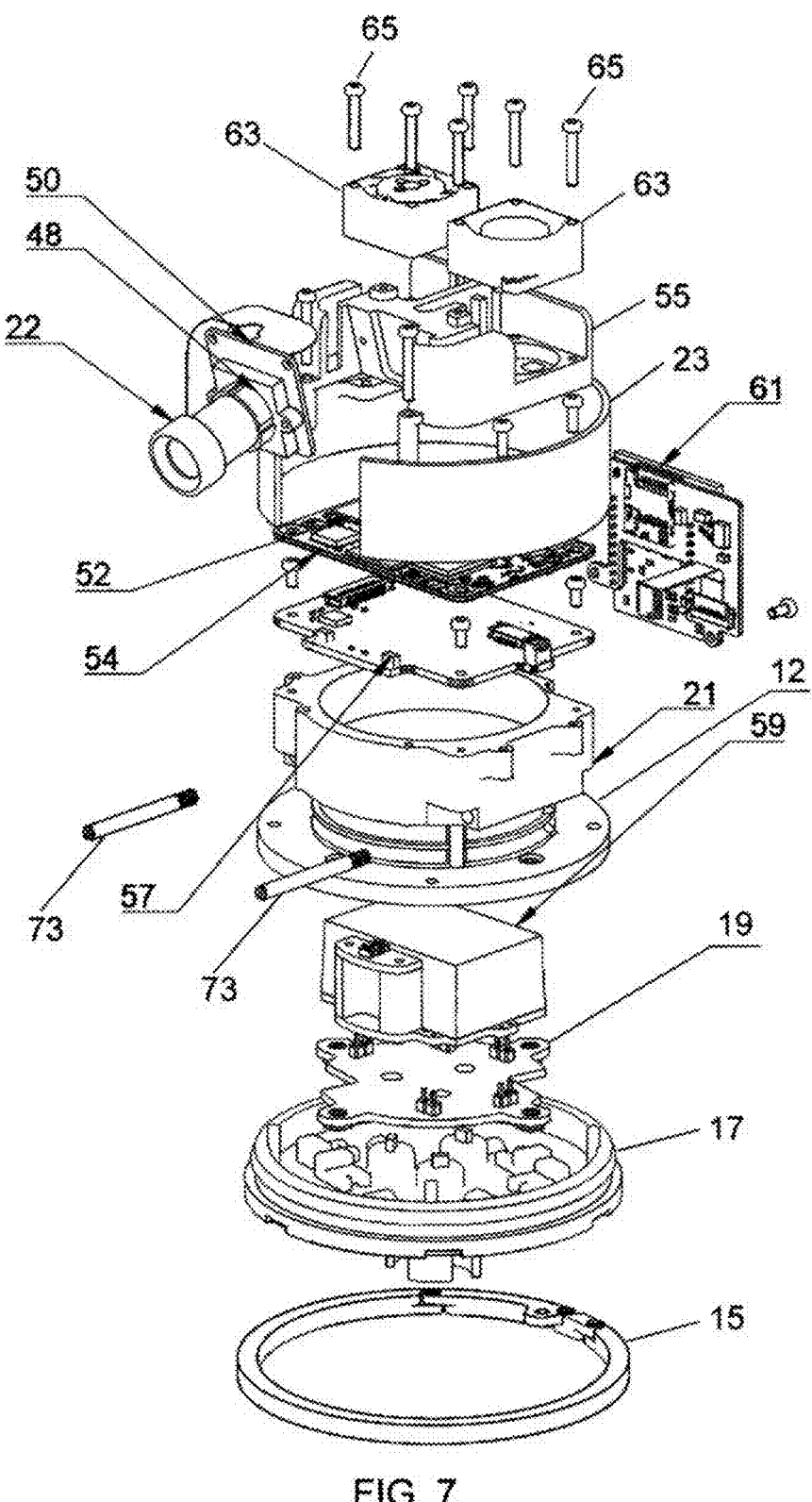
FIG. 7 is an exploded view of the street light controller.
Figure 8:
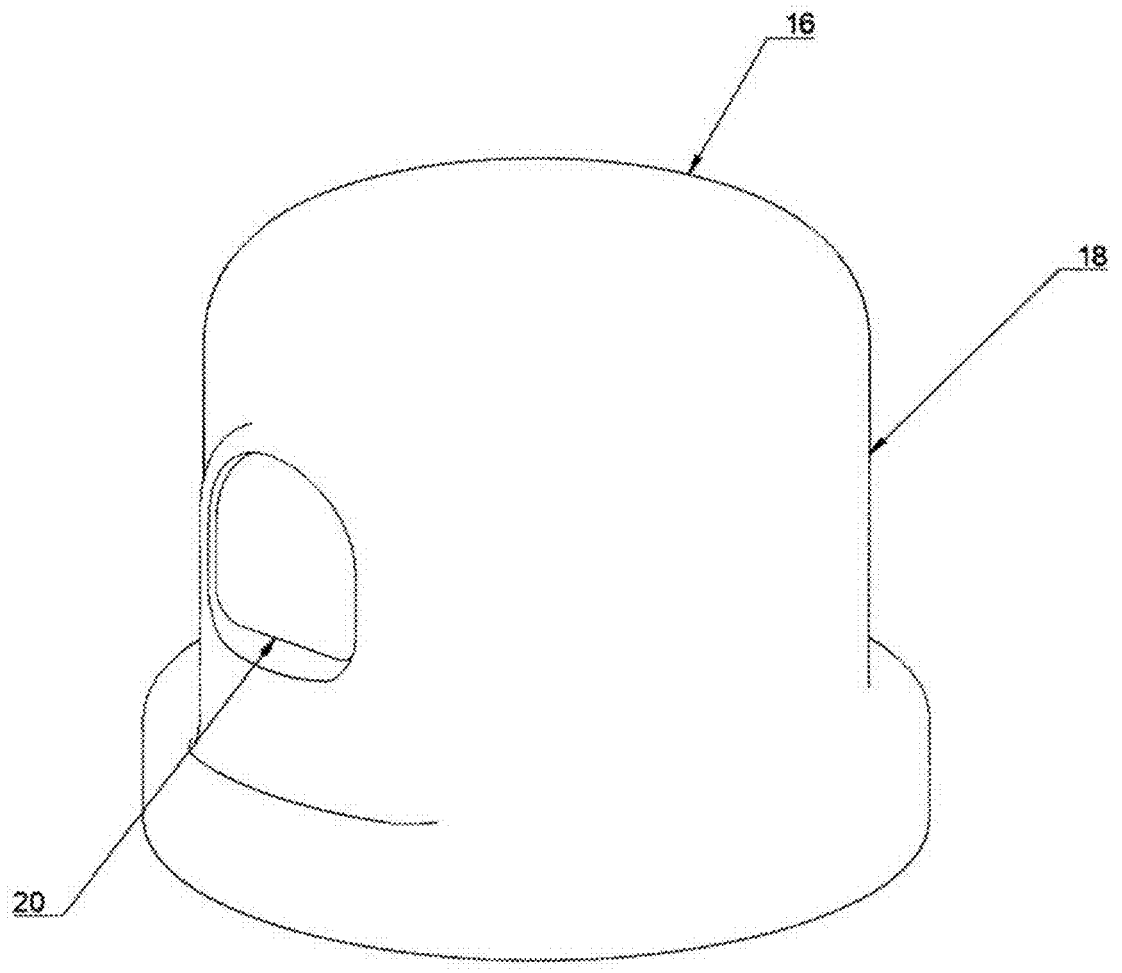
FIG. 8 is a perspective view of an assembled unit.

Referring to the FIGS. 1 and 2, the street light controller and video surveillance system 10 employs a lens 22 coupled to a multi megapixel imaging sensor 48 and control board 50 to produce a video output signal. The image processor 52 takes this signal, and sub samples it to produce a desired video field and resolution as an IP stream. The IP stream is ingested by the control processor 50 having a shape and dimensions being constructed and arranged to fit within a rotatable enclosure. The IP stream is configured by the controller to a rate low enough to be passed over the LTE modem, or onto video management and compression soft-ware for economical transmission over microwave radio connections. In addition to the streaming function, the surveillance system 10 may provide internal video recording using an internal recorder 28, and hosts a cellular modem and/or microwave radio 61 designed to interface with global cellular networks or microwave radio networks in the fre-quency range typically between 0.5 to 300 gigahertz (GHz).

Within the enclosure is a control processor which is connected to a cellular modem or microwave radio 61. The video surveillance system offers direct integration into VMS systems by an IP compatible interface. All settings are available to a user by a server webpage. In operation, the video is sent over the cellular or microwave network to the customer's location. Dependent upon the software installed on the device, this video may be viewed directly using computers or mobile devices, or connected to a server at the customer's location. This server provides the video to the user's video management system. One of the functions of a video management system is to provide a control interface for the remote camera. In this case, the pan, tilt and zoom functions of the device are fully controllable. When the user generates a zoom command at the video management sys-tem station, the command is transferred back through the chain to the camera. Initially, the command is received by the server; this passes the command to the selected device embodiment, a street light controller and video surveillance system via the microwave or cellular link. The system extracts this command from the IP stream and addresses it directly to the image processor. The image processor 52 then translates the command and uses it to set the sensor sub-sampling which sets the digital zoom level. When the user generates a pan or tilt command at the video management system station, the command is transferred back through the chain to the device. Initially, the command is received by the server; this passes the command to the selected device via the cellular or microwave link. The image processor 52 extracts this command from the IP stream and uses it to calculate the correct vertical and horizontal start positions to provide the desired pan and tilt position. Zoom level and pan and tilt position are constantly monitored by the image processor, allowing the system to both save and recall preset positions when commanded to do so by the user. The image processor controls the sampling of the multi megapixel imaging sensor. In its simplest form, this sub sampling would be to use one pixel, then skip the next $(X-1)$ pixels in both the horizontal and vertical direction. The interval value X represents the number of times greater the horizon-tal and vertical pixel count of the sensor is to the required output resolution.

The camera offers a zoom capability, the control processor 54 with cellular modem and/or microwave radio 61 allows for live video to be transferred across the cellular or microwave network, and the internal recorder 28 allows for long term video storage for ease of retrieval.

Referring in general to FIGS. 3-8, illustrated is the street light controller and video surveillance device 10 having a base 12 supporting a multi megapixel video sensor 48 with a NEMA plug 14 extending beneath a NEMA power base 15. A radome retaining ring 17 form an upper section 16 for support of a rotatable enclosure cap 18 forming an extended radome to enclose the street light controller and surveillance device 10.

Secured to the base 12 is a shroud 23 that provides antenna and antenna support mounts band specific antennas 62 used for the cellular modem or microwave radio. Window 20 of the enclosure cap 18 provides an opening for the lens 22. In the preferred embodiment, the diameter of the cap 18 is about 91 mm and the height including base is about 72 mm concealing the device from weather and the general public. The lens 22 is coupled to the multi-megapixel imaging sensor 48 and camera control board 50 including the image processor 52 by a coupling cable 53. Images are directed through a control processor 54 connected to the cellular modem and/or microwave radio 61. Cooling fans 63 are mounted to a heat sink 55 with mounting screws 65. The heat sink 55 providing for dissipation of heat within the cap 18 enclosure.

The system as described allows a pan and tilt camera system to be constructed at a much smaller scale than a comparable mechanical system. The digital pan, tilt and zoom functionality removes the requirement for motors, positional encoders, motor drive circuitry, plus the mechani-cal design does not need to take into account the swept volume of any moving parts within the system. This allows a camera to be manufactured with dimensions much closer to the device it mimics.

The system as described is only capable of moving the field of view within the range of the lens. This limits the pan range of the camera significantly. As an aid to placement of the device, the top portion can be manually rotated to point towards the desired target. Electrical connectivity during this rotation is maintained through the use of a pancake slip ring, directly integrated into the power supply and main printed circuit boards.

The video stream 70 is sent either over the microwave or cellular network. This stream may be directly displayed by computer or handheld electronic device 74, transferred to a decompression server 76 or interfaced directly to the cus-tomers video management system 78. Whichever route is selected, the video is presented to the user on a device 80 which allows for viewing and control of the surveillance system 10.

In addition to the above functions, the control processor 54 also reads the ambient light level as measured by photo sensors 57. The photo sensors are board mounted and coupled to a lower heat sink 21 housing a street light controller 59. The lower heat sink 21 having retainer pins 73 for securing to the base support 12.

The measurement from the photo sensors 57 is used as the input of an algorithm to calculate when the power should be turned on to the street lamp to illuminate it. AC switching is commanded by the control processor 54 via the streetlamp controller 59 using a solid state relay. An AC power distri-bution board 19 is coupled to the NEMA power base 15 for providing conditioned power to the video surveillance sys-tem.

The control processor 54 is mounted to a heat sink 55. The heat sink 55 draws air in and, using a fan, transfers air through the heat sink 55 to dissipate heat from the components. The resulting hot air is vented across the front of the lens 22 to clear any fog or condensation from the lens 22.

Figure 9:
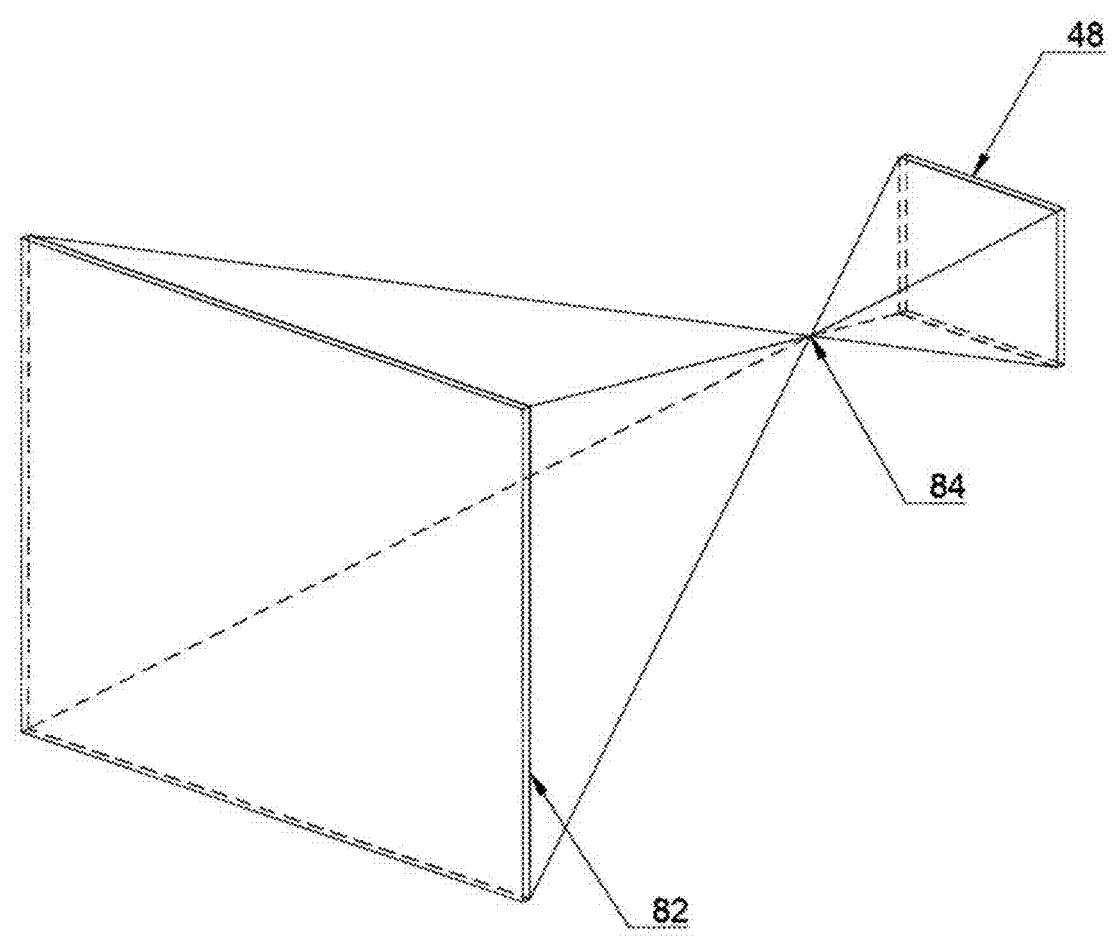
FIG. 9 is a field of view pictorial.

Referring to FIG. 9, the image processor 52 controls the sampling of the multi megapixel imaging sensor 48. In its simplest form, this sub sampling would be to use one pixel, then skip the next (X–1) pixels in both the horizontal and vertical direction. The interval value X represents the number of times greater the horizontal and vertical pixel count of the sensor is to the required output resolution. If a sensor with a pixel count greater than or equal to 7680 by 4320 were used to provide an output of 1920 by 1080, the value X would be four. This interpolated use of the sensor, giving a full field view is shown in FIG. 9, where the field of view 82 is the full range available given the size of the multi megapixel imaging sensor 48 along with the focal length of the lens. In the figure the lens' focal length is shown as the focal point 84 of the light rays.

Figure 10:
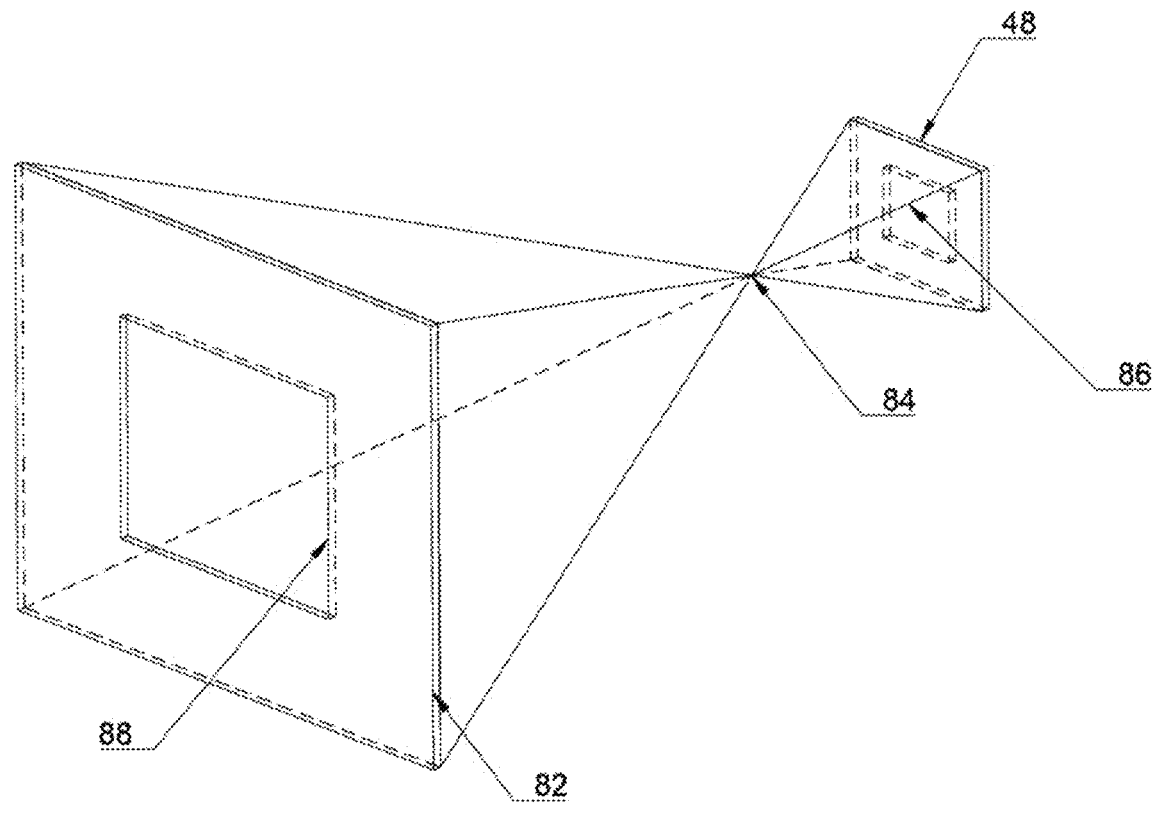
FIG. 10 is a zoomed field of view pictorial.

Referring to FIG. 10, if the interval value X is reduced, the effect is to minimize the sampling area of the sensor. For example, if an interval value of 2 is used, only an area of 3840 by 2160 pixels would be used to create the output of 1920 by 1080. Reducing the sampling area of the multi megapixel imaging sensor 48 reduces its active area 86. With a fixed focal length lens, this reduction of the active area of the sensor reduces the horizontal and vertical viewing angle of the lens 88. In the example above, reducing the horizontal and vertical sampling by 50% reduces the horizontal and vertical viewing angle by 50%, thus creating the effect of a doubling of the focal length.

Figure 11:
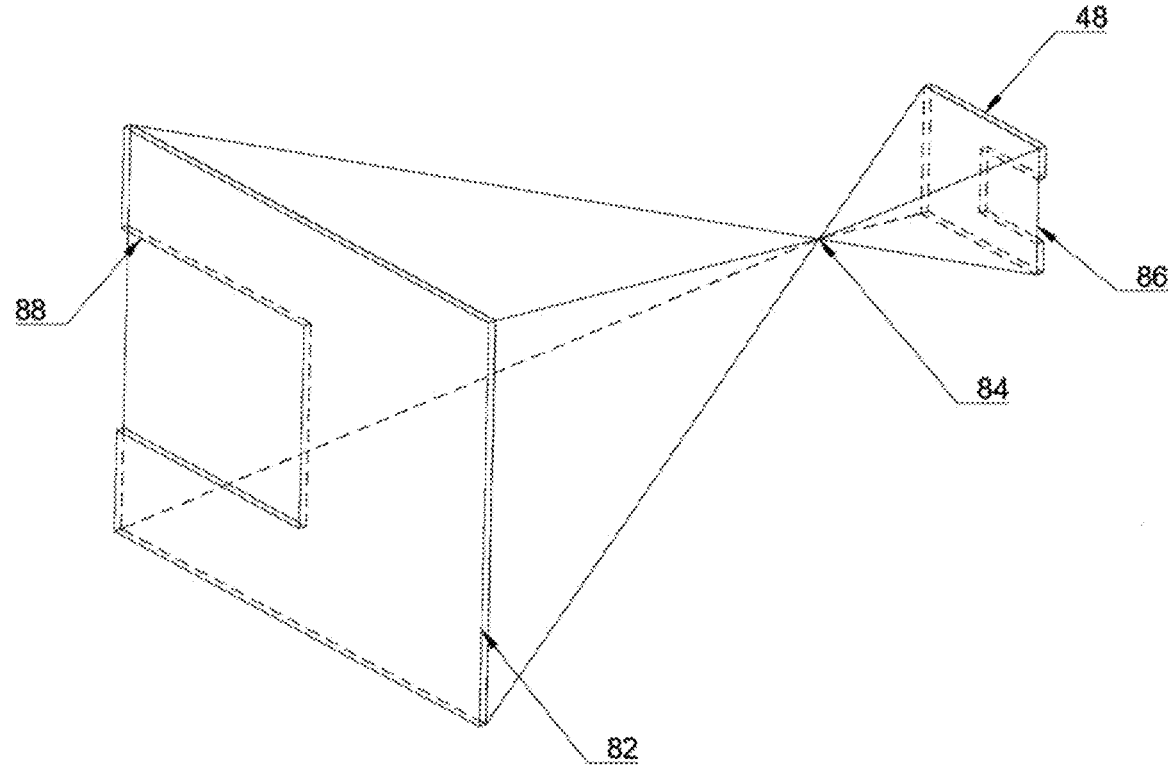
FIG. 11 is a zoomed and panned field of view pictorial.

Referring to FIG. 11, with the sampling area reduced there are unused pixels on the sensor. The sampling area can be moved around the sensor into these unused areas by changing the horizontal and vertical sampling start position on the sensor array. The effect of this to the viewer is to pan and tilt across the range of the lens.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed. The term "about" or "generally about" means, in general, the stated value plus or minus 5%.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/ figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A video surveillance system and street light controller comprising:
   an enclosure having a NEMA coupling securable to a street light NEMA socket;
   a camera with a lens constructed with electronic pan, tilt and zoom capabilities, said camera positioned within said enclosure and electrically coupled to a power source, said camera forming a video output;
   an image processor coupled to said camera providing a video output using a multi-megapixel imaging sensor having a greater number of pixels than required for a desired resolution to allow sub-sampling in the form of a window of pixels wherein said imaging sensor has a resolution equal to or greater than a first resolution defined by a horizontal pixel count and a vertical pixel count and said sub-sampling of image data is performed by selecting one pixel at intervals of X pixels in both the horizontal and vertical directions, wherein the value of X is determined by the ratio of the imaging sensor's resolution to a second resolution required for a video output;
   a video encoder for receipt of said video output from said image processor and encoding the video output;
   a transmitter for wireless transmission of said encoded video output; and
   a photosensor coupled to said NEMA coupling;
   wherein said video surveillance system replaces a conventional NEMA socket based street light controller for providing street light control and video for discrete surveillance.

2. The video surveillance system according to claim 1 including a video compressor to control and reduce video bandwidth of said transmission.

3. The video surveillance system according to claim 1 wherein said transmitter is a cellular modem for wireless coupling to a cellular network.

4. The video surveillance system according to claim 1 wherein said transmitter is a microwave radio for wireless coupling to a microwave radio network.

5. The video surveillance system according to claim 1 wherein said image processor and sensor increases the magnification of a video without changing the focal length of said lens by changing the position of a window of pixels on the sensor wherein the view angle through the lens is altered providing an electronic pan and tilt function within the optical range of the lens.

6. The video surveillance system according to claim 5 wherein the position of the window of pixels and size of the window of pixels can be stored and recalled by a preset view function.

7. The video surveillance system according to claim 1 wherein said camera includes a video recorder for storage of video surveillance.

8. The video surveillance system according to claim 1 wherein said enclosure is equal to or less than 91 mm in diameter and 72 mm in height.

9. The video surveillance system according to claim 1 including a heat sink with fans constructed and arranged to dissipate heat within said enclosure and condensation from the lens.

10. The video surveillance system according to claim 1 including a pancake slip ring integrated into said base to maintain electrical connectivity if said camera is rotated.

11. The video surveillance system according to claim 1 wherein said photo sensor provides a measurement of ambient light based on an algorithm to determine when the street lamp is to be illuminated.

12. The video surveillance system according to claim 1 wherein the interval value X is adjustable to vary the sampling area of the imaging sensor whereby reducing X minimizes the sampling area, limiting the active area of the sensor and reducing the horizontal and vertical viewing angles of the lens and increasing X maximizes the sampling area, utilizing a larger portion of the sensor and preserving the full field of view determined by the imaging sensor and lens combination.

13. The video surveillance system according to claim 1 wherein reducing horizontal and vertical viewing angles of the lens by 50% creates the effect of doubling the focal length.

14. The video surveillance system according to claim 1 wherein said imaging processor is configured to shift the sampling area horizontally and vertically within the unused regions by modifying the sampling start position, thereby enabling panning and tilting of the output image across the full range of the lens.

15. The video surveillance system of claim 1, wherein said imaging processor is further configured to maintain the aspect ratio of the output image during adjustments to the sampling area.

16. The video surveillance system of claim 1, wherein the subsampling process maintains the effective resolution of the output image while varying the field of view based on the sampling area and lens focal length.

* * * * *